(12) United States Patent
Bressan

(10) Patent No.: US 8,224,092 B2
(45) Date of Patent: Jul. 17, 2012

(54) WORD DETECTION METHOD AND SYSTEM

(75) Inventor: Marco J. Bressan, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1043 days.

(21) Appl. No.: 12/169,101

(22) Filed: Jul. 8, 2008

(65) Prior Publication Data

US 2010/0008581 A1    Jan. 14, 2010

(51) Int. Cl.
*G06K 9/34* (2006.01)
(52) U.S. Cl. ...................................... 382/177
(58) Field of Classification Search .......... 382/181, 382/186–187, 190, 224, 229, 177, 179; 704/251
See application file for complete search history.

(56) References Cited

U.S. PATENT DOCUMENTS

| | | | |
|---|---|---|---|
| 5,267,326 A * | 11/1993 | Rao ............................ | 382/179 |
| 5,438,630 A | 8/1995 | Chen et al. | |
| 5,745,600 A | 4/1998 | Chen et al. | |
| 5,794,194 A * | 8/1998 | Takebayashi et al. ........ | 704/251 |
| 5,825,919 A | 10/1998 | Bloomberg et al. | |
| 5,841,902 A | 11/1998 | Tu | |
| 6,091,859 A | 7/2000 | Sonobe et al. | |
| 2006/0123000 A1 * | 6/2006 | Baxter et al. ...................... | 707/5 |
| 2007/0005356 A1 | 1/2007 | Perronnin | |
| 2007/0258648 A1 | 11/2007 | Perronnin | |
| 2008/0069456 A1 | 3/2008 | Perronnin | |

OTHER PUBLICATIONS

Marti, et al. (Using a Statistical Language Model to Improve the Performance of an HMM—based Cursive Handwriting Recognition System), pp. 1-27, Aug. 25, 2000.*
Nowak (Sampling Strategies for Bag-of-Features image Classification), pp. 490-503, 2006.*
U.S. Appl. No. 11/847,742, filed Aug. 30, 2007, Bressan, et al.
U.S. Appl. No. 11/847,757, filed Aug. 30, 2007, Serrano, et al.
U.S. Appl. No. 12/014,193, filed Jan. 15, 2008, Rodriguez, et al.
A.Agarwal, et al., Hyperfeatures—Multilevel Local Coding for Visual Recognition, *ECCV06*, 2006.
G.Csurka, et al., Visual Categorization With Bags of Keypoints, *Proc. ECCV Intl. Workshop on Statistical Learning in Computer Vision*, 2004.
U.Mahadevan, et al., Gap Metrics for Word Separation in Handwritten Lines, *In $3^{rd}$ Intl. Conf. on Document Analysis and Recognition*, vol. 1, p. 124, IEEE Computer Society, 1995 (Abstract).
K.Takru, et al., Separation of Touching and Overlapping Words in Adjacent Lines of Handwritten Text, *In Proc. of the $8^{th}$ Intl. Workshop on Frontiers in Handwriting Recognition (IWFHR '02)*, p.496, IEEE Computer Society, 2002 (Abstract).
H.Bunke, Recognition of Cursive Roman Handwriting—Past, Present, and Future, *In Proc. of the $7^{th}$ Intl. Conf. on Document Analysis and Recognition (ICDAR)*, 2003.
T.M.Rath, et al., *Features for Word Spotting in Historical Manuscripts*, ISSN 0/7695-1960-1, p. 218, 2003.

* cited by examiner

*Primary Examiner* — Daniel Mariam
(74) *Attorney, Agent, or Firm* — Fay Sharpe LLP

(57) ABSTRACT

A method of characterizing a word image includes traversing the word image in steps with a window and at each of a plurality of the steps, identifying a window image. For each of the plurality of window images, a feature is extracted. The word image is characterized, based on the features extracted from the plurality of window images, wherein the features are considered as a loose collection with associated sequential information.

25 Claims, 10 Drawing Sheets

WORD DETECTION METHOD AND SYSTEM

CROSS REFERENCE TO RELATED PATENTS AND APPLICATIONS

The following copending applications, the disclosures of which are incorporated herein in their entireties by reference, are mentioned:

U.S. application Ser. No. 11/847,742, filed on Aug. 30, 2007, entitled FEATURES GENERATION AND SPOTTING METHODS AND SYSTEMS USING SAME, by Bressan, et al.;

U.S. application Ser. No. 11/847,757, filed on Aug. 30, 2007, entitled SYSTEM AND METHOD FOR CHARACTERIZING HANDWRITTEN OR TYPED WORDS IN A DOCUMENT, by Serrano, et al.; and U.S. application Ser. No. 12/014,193, filed on Jan. 15, 2008, entitled ASYMMETRIC SCORE NORMALIZATION FOR AN HMM-BASED HANDWRITTEN WORD SPOTTING SYSTEM, by Rodriguez, et al.

BACKGROUND

The exemplary embodiment relates generally to recognition of objects, such as text objects in document images and more specifically to a technique for detecting character strings (keywords) in a document image without having to detect or identify the individual characters making up the strings or the full text. The exemplary embodiment finds application in document processing, analysis, sorting, detection, word spotting, and related arts.

Text of electronically encoded documents tends to be found in either of two distinct formats, namely bitmap format and character code format. In the former, the text is defined in terms of an array of pixels corresponding to the visual appearance of the page. A binary image is one in which a given pixel is either ON (typically black) or OFF (typically white). A pixel can be represented by one bit in a larger data structure. A grayscale image is one where each pixel can assume one of a number of shades of gray ranging from white to black. An N-bit pixel can represent $2^N$ shades of gray. In a bitmap image, every pixel on the image has equal significance, and virtually any type of image (text, line graphics, and pictorial) can be represented this way. In character code format, the text is represented as a string of character codes, the most common being the ASCII codes. A character is typically represented by 8 bits.

There are many applications where it is desirable for character strings to be extracted from a document or a portion thereof which is in bitmap format. For example, a document may be available only in a printed version. In the domain of automated document processing, for example, a common task involves the categorization of documents. Many of the documents to be categorized are received in paper form, either because of their "legal" significance, as a backlog of old documents to be archived, or as general-purpose correspondence, and they need to be classified. Various techniques exist for classifying documents, whether based on the aspect of documents, on the textual content, or based on templates. All these techniques have their specific advantages and drawbacks.

By performing optical character recognition (OCR), a document in bitmap format, such as a scanned physical document, can be converted into a character code format, such as an ASCII text format, XML format including text, a format compatible with a selected word processor, or other symbolic representation. The OCR converted document can then be searched for certain keywords or other textual features to, for example, classify documents or identify documents pertaining to a particular subject. OCR has numerous advantages, but is computationally intensive. In many applications, it is not practical to apply OCR to every received document.

There are a number of applications where the identification of whole words rather than individual characters or recognition of the full text is sufficient. For example, in some applications, it may be desirable to identify documents, such as incoming mail, which include any one of a set of triggering words. These documents may then be processed differently from the rest of the mail. For example, an organization dealing with contracts may wish to identify documents which include keywords such as "termination" or "cancellation" so that such documents can receive prompt attention. Other organizations may wish to characterize documents according to their subject matter for processing by different groups within the organization.

It has been shown that identification of whole words is more robust for degraded images containing broken and touching characters. One system, based on hidden Markov models (HMMs), represents words as a concatenation of single-state character HMMs. This system requires segmentation of the characters prior to feature extraction. Another system uses multiple-state HMMs to model characters without requiring segmentation of words into characters. However, segmentation of words into sub-character segments based on stroke and arc analysis is required prior to feature extraction. In both these HMM-based systems, the segmentation can introduce errors at an early stage in processing.

A method which is able to identify whole words in a document image quickly and with a high degree of accuracy is thus desirable for a variety of applications.

INCORPORATION BY REFERENCE

The following references, the disclosures of which are incorporated herein in their entireties by reference, are mentioned:

U.S. Pat. No. 5,841,902 to Tu discloses a character recognition system which includes a character input device, such as a stylus and tablet or optical scanner, for receiving inputted characters, and a processor. The processor determines which of a number of model characters best matches the inputted character. The processor extracts a feature value vector from the inputted character and compares it to the mean feature value vector of each class of characters. The processor recognizes the inputted character as the model character corresponding to the mean feature value vector which is closest to the feature value vector of the inputted character. The processor also constructs a database from multiple specimens of each model character. The processor organizes the specimens of each model character into multiple classes. The processor then determines the mean feature value vector of each class.

U.S. Pat. No. 5,438,630 to Chen, et al. and U.S. Pat. No. 5,825,919 to Bloomberg, et al. are both directed to methods for word identification which are based on features of the entire word, without the need for segmentation or OCR, and without the need to recognize non-keywords. In the method of Chen, for example, font-independent character models are created using Hidden Markov Models (HMMs) and arbitrary keyword models are built from the character HMM components. Word or text line bounding boxes are extracted from the image. A set of features based on the word shape (and optionally also the word internal structure) within each bounding box is extracted. This set of features is applied to a network that includes one or more keyword HMMs.

The above-mentioned U.S. application Ser. Nos. 11/847, 742; 11/847,757; and 12/014,193 all relate to word spotting.

The following references disclose visual categorization systems: U.S. Pub. No. 2007/0005356, entitled GENERIC VISUAL CATEGORIZATION METHOD AND SYSTEM, by Perronnin; U.S. Pub. No. 2008/0069456, entitled BAGS OF VISUAL CONTEXT-DEPENDENT WORDS FOR GENERIC VISUAL CATEGORIZATION, by Perronnin; U.S. Pub. No. 2007/0258648, entitled GENERIC VISUAL CLASSIFICATION WITH GRADIENT COMPONENTS-BASED DIMENSIONALITY ENHANCEMENT, by Perronnin; A. Agarwal and B. Triggs, "*Hyperfeatures—Multilevel Local Coding for Visual Recognition*", ECCV06, 2006; and Csurka, Dance, Fan, Willamowski and Bray, "Visual Categorization With Bags-Of-Keypoints", Proc. ECCV International Workshop on Statistical Learning in Computer Vision, 2004.

BRIEF DESCRIPTION

In accordance with one aspect of the exemplary embodiment, a method of characterizing a word image includes traversing the word image in steps with a window and at each of a plurality of the steps, identifying a window image. For each of the plurality of window images, a feature is extracted. The word image is characterized based on the features extracted from the plurality of window images, wherein the features are considered as a loose collection with associated sequential information.

In accordance with another aspect of the exemplary embodiment, a method of characterizing a word image includes traversing the word image in steps with a window and at each of a plurality of the steps, displacing the window based on a center of gravity of image data within the window, to provide a window image. For each of the plurality of window images, a feature is extracted. The word image is characterized, based on the features extracted from the plurality of window images.

In another aspect, a processing system includes a document segmentor which processes an input document image to identify word images. A features extractor extracts features of an identified word image and computes features vectors therefrom, the features extractor executing instructions for traversing the word image stepwise with a window and, at each of a plurality of the steps, displacing the window towards a center of gravity of image data within the window to provide a window image and, for each of the plurality of window images, computing a feature based on image data within the displaced window. A classifier classifies the word image based on the computed features of the window images and location information for the window images.

DETAILED DESCRIPTION

Figure 1:
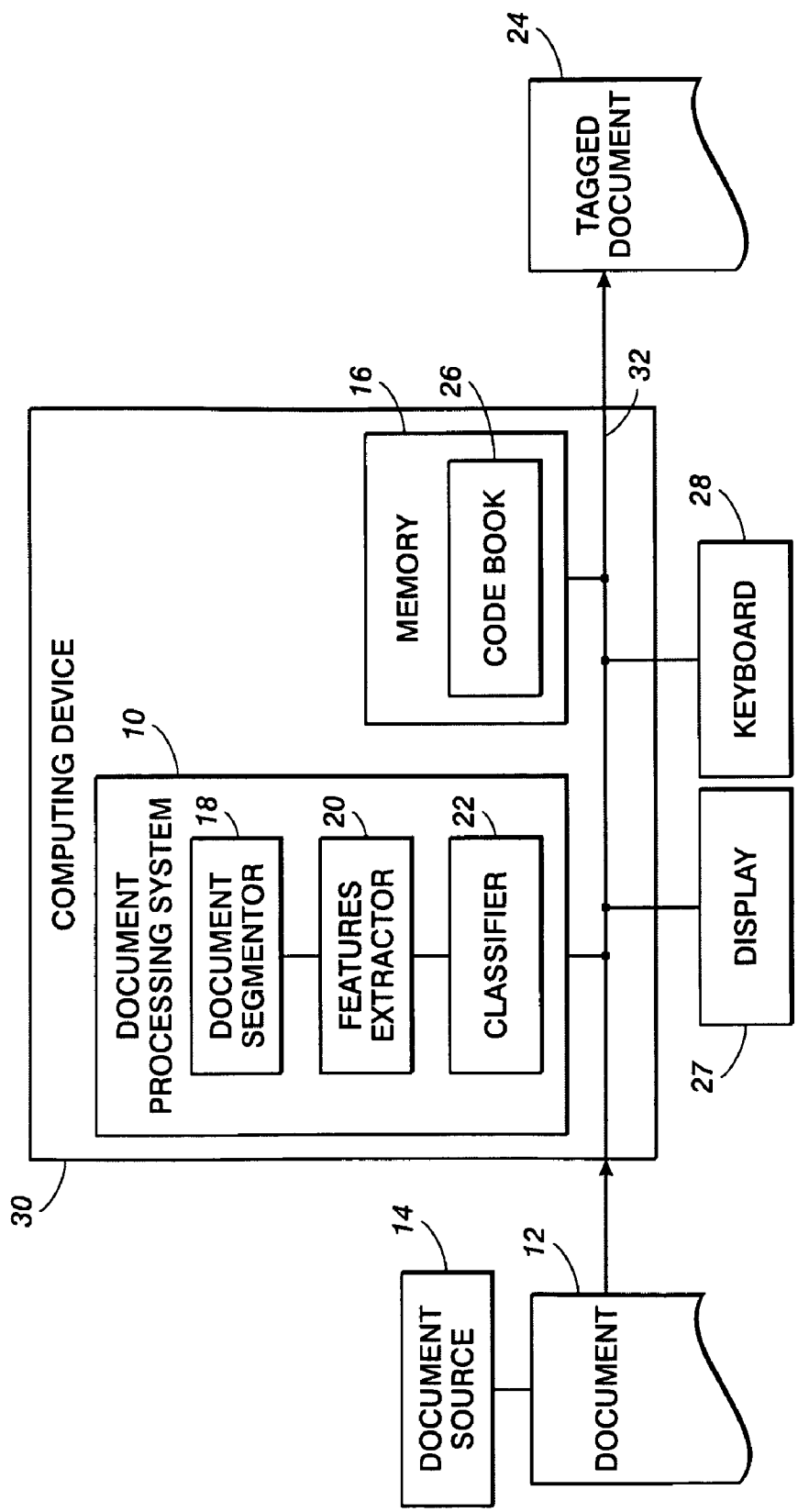
FIG. 1 is a functional block diagram of an environment in which an apparatus for processing documents operates according to a first aspect of the exemplary embodiment.

Word spotting is the problem of determining the presence of a given word in a document. From an imaging perspective it is a particular type of object detection problem. As in most object detection approaches, there is first a segmentation stage, then a fast rejection stage for eliminating false positives and, finally, a classification stage. In existing word spotting methods, the segmentation is usually performed at a single scale and over-segmentation is preferred to account for errors. The classification can use fast rejection techniques which need not be as complex as are used in general object detection techniques, since the chances for false positives are generally low. Data normalization can also take place before and/or after the fast rejection stage. The normalization allows intra-word variations such as font size, pen-type, writer style, and the like to be taken into account. The features used for classification in word spotting usually take into account the sequential nature of words.

Aspects of the exemplary embodiment relate to an apparatus and method for characterizing word images (generally images of handwritten or typed words) in document images and to a computer program product which includes instructions for performing the exemplary method.

The exemplary method for word identification is based on features of the entire word, without the need for segmentation into individual characters or OCR, and without the need to recognize non-keywords. In particular, a sliding window is translated across a word image and features extracted from image data in the windows.

Above-mentioned U.S. application Ser. Nos. 11/847,742 and 11/847,757, filed on Aug. 30, 2007, incorporated herein disclose methods for word spotting in which a sliding window is traversed stepwise across an image, which is presumed to be a word, and at each step features within the window are extracted. The extracted features can then be compared with features of known words stored in a database, often referred to as a codebook.

While the methods described in these applications provide effective techniques for word spotting, many of the features extracted from the windows lack useful information. The present exemplary embodiment increases the usefulness of the information gained from the windows without necessarily increasing computation time.

In one aspect, a method for characterizing a word image includes traversing a word image stepwise with a window and for each of a plurality of the steps, identifying a window image at each step, extracting at least one feature vector from the image data within the window image. The word image can then be characterized, based on the feature vectors extracted from the plurality of windows images by considering the feature vectors as a loose collection with associated sequential information.

In another aspect, a center of gravity of the image data encompassed by the window is determined at each step and the window centered on the center of gravity. Features are then extracted from the image data within the centered window. The word image can then be characterized, based on the features extracted from the plurality of centered windows. For example, the characterizing can include comparing the extracted features to those of known words stored in a codebook. The irregular grid of horizontally displaced windows resulting from the recentering is shown to improve detection quality with respect to the regular grid used in prior methods. This may be due to increased invariance to translations and focus on regions of interest.

While various different types of features can be extracted from the windows, including those described in above-mentioned application Ser. Nos. 11/847,742; 11/847,757, and 12/014,193, in one embodiment a "Bag of Visual Word" (BOVW) approach suited for handwritten word spotting is employed, as described in further detail below.

In another aspect, a system for characterizing a word image includes memory which stores instructions for performing the exemplary method and a processor which executes the instructions. A classifier can be used to classify the word, based on the features and a codebook of stored features of known words. In the exemplary embodiment, the classifier classifies the word image based on a bag of visual word images. Examples of other classifiers which may be used include Hidden Markov Models and those which employ dynamic time warping, string matching, and the like. Based on the classification, a determination may be made as to whether the word image corresponds to a given keyword which the classifier has been trained to identify.

One application of the exemplary apparatus and method is the automated identification of specific keywords in documents, and flagging documents based on the keyword or keywords identified for further processing according a predetermined procedure. For example, in the context of classification of incoming mail, documents which are determined to include certain keywords such as "termination" or "cancellation" may be automatically flagged for prompt processing in advance of documents for which none of the predefined keywords are identified. In the context of segregation of documents according to content, the presence of a particular keyword or keywords may be used to direct the document to a particular recipient. For example, one of a plurality of recipients may be designated to receive documents which are determined to include a first keyword and another recipient may be designated to receive documents determined to include a second keyword. For example, a government organization may include a department of the environment and a justice department. A set of environment related keywords may be defined which are most specific to the types of documents of interest to the environment department, such as "environment," and "biodiversity," or groups of keywords, such as "global warming" and "climate change". A different set of keywords may be defined for the justice department, such as "justice," "law enforcement," and so forth. Documents identified as including environment-related keywords (or a preponderance of environment-related keywords), for example, may be initially routed to the environment department, where a human observer may confirm the document has been properly routed. Alternatively or additionally, documents in which keywords have been identified may be subjected to more rigorous automated processing, such as OCR.

Word spotting refers generally to the task of detecting the presence of certain words without directly using recognition techniques. As will be appreciated, the exemplary embodiment finds application in a variety of word spotting and other document processing contexts and is not limited to the applications described herein.

The exemplary embodiment is discussed in the context of binary images. In this context, the term "image" refers to a representation of a two-dimensional data structure composed of pixels. A binary image is an image where a given pixel is either "ON" (active) or "OFF" (inactive). Pixels are generally defined to be active if they are black and inactive if they are white. It should be noted that the designation of black as ON and white as OFF reflects the fact that most documents of interest have a black foreground and a white background. It is to be appreciated that the exemplary method is not limited to black and white images but is appropriate to images of any suitable color separation or separations. Negative images may be converted to positive images, if desired, prior to processing.

Word images are generally images of single (or sometimes multiple) words and/or numbers comprising typed or handwritten text. Each word image may comprise a character string comprising a group of characters, such as letters and/or numbers) which are sufficiently closely grouped together to allow the word image to be distinguished from other word images in the document. The character strings to be identified are generally known words in a particular natural language, such as English or French. However, it is to be appreciated that word images may also comprise logos and any other recognizable representation which can be reliably extracted from a document image as a discrete image.

In the exemplary embodiment, a word image (handwritten or typed) is mathematically characterized by a sequence of features. The sequence may consist of a different number of features from one word image to another. Pattern recognition techniques may then be applied to the features to determine whether the word image corresponds to a given keyword in a codebook. A variety of classifiers for data of such a nature may be employed, such as linear classifiers, e.g., Linear Fisher Discriminant Analysis (LDA) or Linear Sparse Logistic Regression (SLR), or hidden Markov models, dynamic time warping, string matching, or the like. The feature choice can have a dramatic impact independently of the classifier. The features generated by the exemplary method have been shown to improve significantly the performance of a handwritten word spotter, as compared to conventional word spotting techniques.

With reference to FIG. 1, an exemplary environment in which a system 10 for characterization of word images in documents operates is shown. The processing components of the system 10 are best understood with reference to FIG. 2, which illustrates an exemplary method for characterization of word images. Accordingly, the operation of these components will be described only briefly here.

Documents 12 to be processed by system 10 are received from a suitable source 14 of such documents, such as a scanner, camera, data storage device, or the like. Each document 12 may comprise one or more digital pages, each page comprising one or more images, such as binary images. In one aspect of the exemplary embodiment, the documents 12 to be processed comprise scanned images of physical documents which include text that may be typed or handwritten (e.g., in cursive script), such as correspondence. During processing, document images and word images may be stored in memory storage media 16, incorporated into or otherwise accessible to the system 10. The system 10 includes a document segmentor 18 which processes a document image to identify word images, generally by identifying clusters of active pixels which are surrounded by inactive pixels. The segmentor 18 operates without consideration of the individual characters which form the word image. A word image can thus comprise any object within a document image, such as a word, numbers, a company logo, combination thereof, and the like, which is capable of being identified as a discrete entity by the particular segmentation techniques being used.

A window image generator 20 identifies window images (patches) in a word image that has been identified by the segmentor 18. In particular, the window image generator 20 performs a stepwise translation of the image with a window of fixed size, computes a center of gravity of the image data within the window, and re-centers the window to generate a window image comprising a subset of the image data in the word image. In other embodiments, the window images are generated uniformly, i.e., without the recentering. In both embodiments, the window images (patches) are all of the same width.

A features extractor 22 extracts features of an identified word image from the horizontally displaced window images. In particular, the features are extracted from each of the window images, each one corresponding to the position of a sliding window. A classifier 24 may be used to compute whether a match exists between a word image, as characterized by its patch features and optionally its location in the word image, and those of a correspondingly characterized one or more of set of predefined keywords stored in memory in a codebook 26. The classifier may be trained on features vectors and location information that are extracted in a similar manner from one or more of word images of a given keyword that is sought to be identified, where present in the document. The classifier 24 may comprise multiple classifiers, one for each of a set of keywords, and may employ information stored in memory 16. The codebook 26 may include, for each of a set of known words, a characterization of one or more word images derived from patch features extracted from the word image(s) of the known word and patch location information.

The documents 12 processed by the system 10 may be tagged, e.g., with XML tags, which identify the keyword(s) present, optionally their locations in the document, and/or other information based on the keywords identified, such as a classification of the overall document. The classification of the document may be used to determine the routing of the document or whether it will undergo further processing, such as OCR. The tagged documents 25 may be then output by the system 10. In one embodiment, processing system 10 communicates with a display 27, for displaying an image of the document. The illustrated display 27 can be a liquid crystal display (LCD), a plasma display, a cathode ray tube (CRT) display, a projection display, or the like. The document image may be highlighted or otherwise modified to indicate any keywords identified by the processing system 10, e.g., for verification by a person using a suitable user input device 28, such as a keyboard, keypad, trackball, touch screen, voice recognition input device, or the like.

Processing system 10 may be hosted by any suitable computing device 30 that is capable of processing data, such as a general purpose computer, e.g., a desktop or laptop computer or a PDA or the like. Alternatively the host computer may be a dedicated computing device. The various components of the computer 30 may be all connected by a bus 32

Each of the processing components 18, 20, 22, 24 may be in the form of software, hardware, or both. The processing components 18, 20, 22, 24 of processing system 10 may be in the form of software instructions, stored in memory 16 or elsewhere, for performing the exemplary method described with reference to FIG. 2. A processor 34, such as a central processing unit, or separate processors for each component in communication with the memory 16, executes the software instructions. While the system 10 is shown as having four processing components 18, 20, 22, 24, it is to be appreciated that two or more components may be combined or a component divided into two or more components. Components 18, 20, 22, 24 may all be resident in computing device 30 or may be otherwise accessible thereto.

Memory 16 can include random access memory (RAM), read-only memory (ROM), a hard disk, optical disk, or so forth and may be all physically located in the computing device or parts thereof may be accessible to the computing device, e.g., via a local area network or the Internet. The memory 16 may store data, including a document 12 and software for performing analysis and markup of the document. The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The processor 34 can be resident on one or more general purpose computers, special purpose computer(s), or the like and take the form of a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used as the processor 34.

Figure 2:
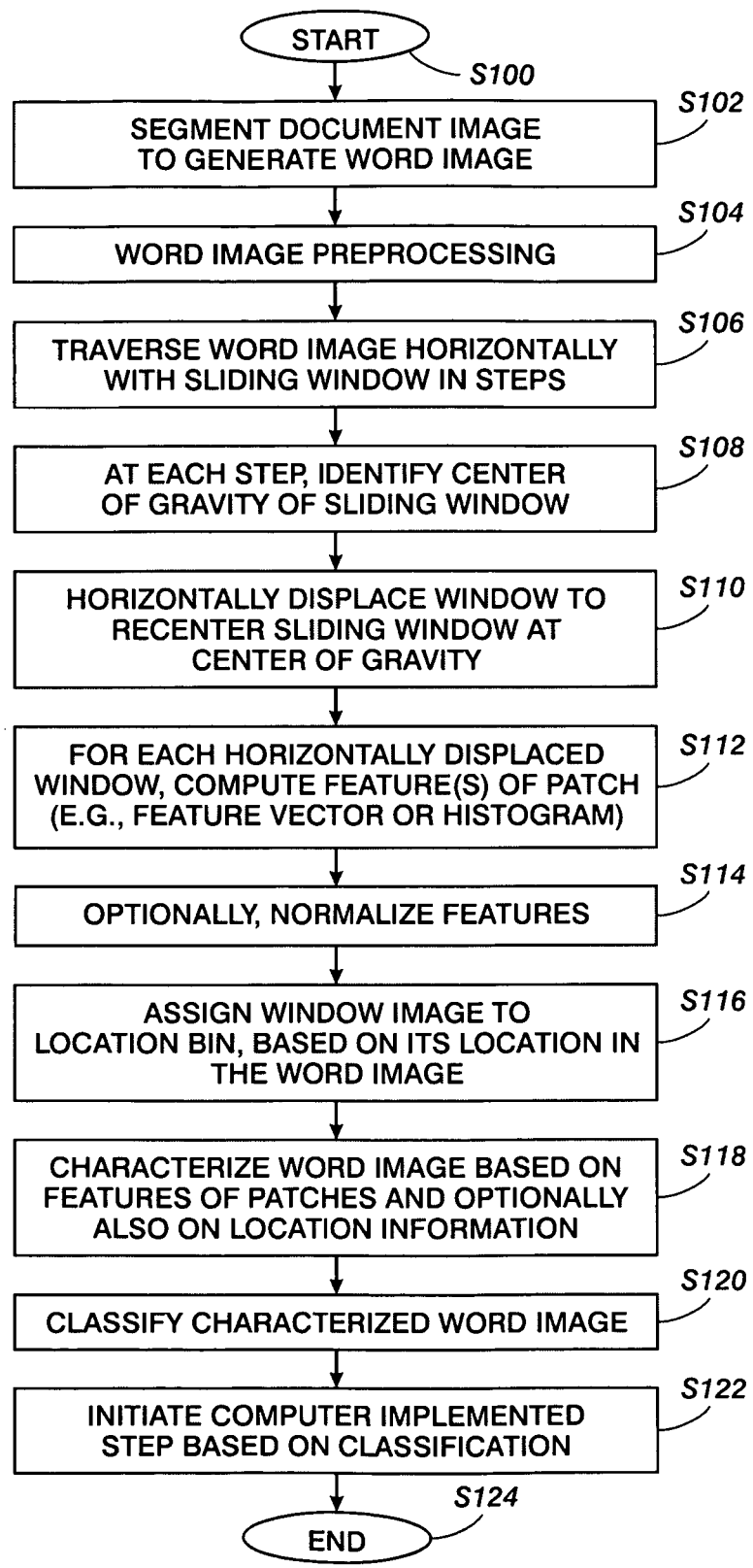
FIG. 2 illustrates an exemplary method for processing documents which may be performed with the apparatus of FIG. 1 in accordance with a second aspect of the exemplary embodiment.

Having described an exemplary system for processing documents, a method which may be performed with the exemplary system will now be described. FIG. 2 illustrates steps in an exemplary method for text recognition in document images. It is to be appreciated that the method may include fewer, more or different steps from those illustrated and need to proceed in the order illustrated. Briefly, the method proceeds as follows.

The method begins at S100. S102 includes optically reading a handwritten or typed word so as to form an image representation thereof (a word image) comprising a bitmap of pixels.

At S104, the acquired word image may be subjected to one or more pre-processing steps. These pre-processing steps may include normalizing the size of the word image such that two word images of the same word will have approximately the same normalized length (and thus generate approximately the same number of windows).

At S106, a sliding window is traversed stepwise across the word image. In general, for Roman cursive handwriting or typed text, a rectangular sliding window is moved from the left to the right of the word image, i.e., along an axis parallel to the direction in which the characters are sequentially written or typed. In particular the window starts at a position which encompasses a first end of the word image (generally expected to be the start of a word) and moves in a plurality of steps to a position which encompasses the second end of the word image (generally expected to be the end of the word). For processing of documents that use languages which normally extend in right to left or top to bottom directions, the window can follow the particular direction. The steps may be of a uniform size such as a fixed number of pixels.

For each window, a horizontal displacement value is optionally computed from window statistics (S108). In particular, the center of gravity of the image data in the window is computed.

At S110 the window is optionally displaced such that it is re-centered on the center of gravity.

At S112, one or more features of the window image within the centered window are computed. The features may be based on gradient histograms, feature vectors, or the like.

At S114, the window image may be assigned to an appropriate location bin from a set of location bins spanning the image horizontally.

At S116, normalization of the features may be performed so that the sum of the components is a fixed value, e.g., 1.

Steps 108, 110, 112, S114 and S116 are repeated a plurality of times until the word image is traversed. For each stepwise translation, the window is moved, e.g., a fixed number of pixels, from the position of the previous step, prior to recentering (if recentering is to be used), until the complete image is traversed.

At S118, the word image is characterized, based on high level descriptors generated from the set of computed features, as described in greater detail below.

At S120, the characterized word image may be classified using a classifier having access to a stored codebook generated using training word images. The method may return to S106 and steps S106 to S120 repeated for each word image identified in the document.

At S122, a computer implemented step may be automatically initiated, based on the characterization/classification of the word image. The method ends at S124.

The method illustrated in FIG. 2 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

Figure 4:
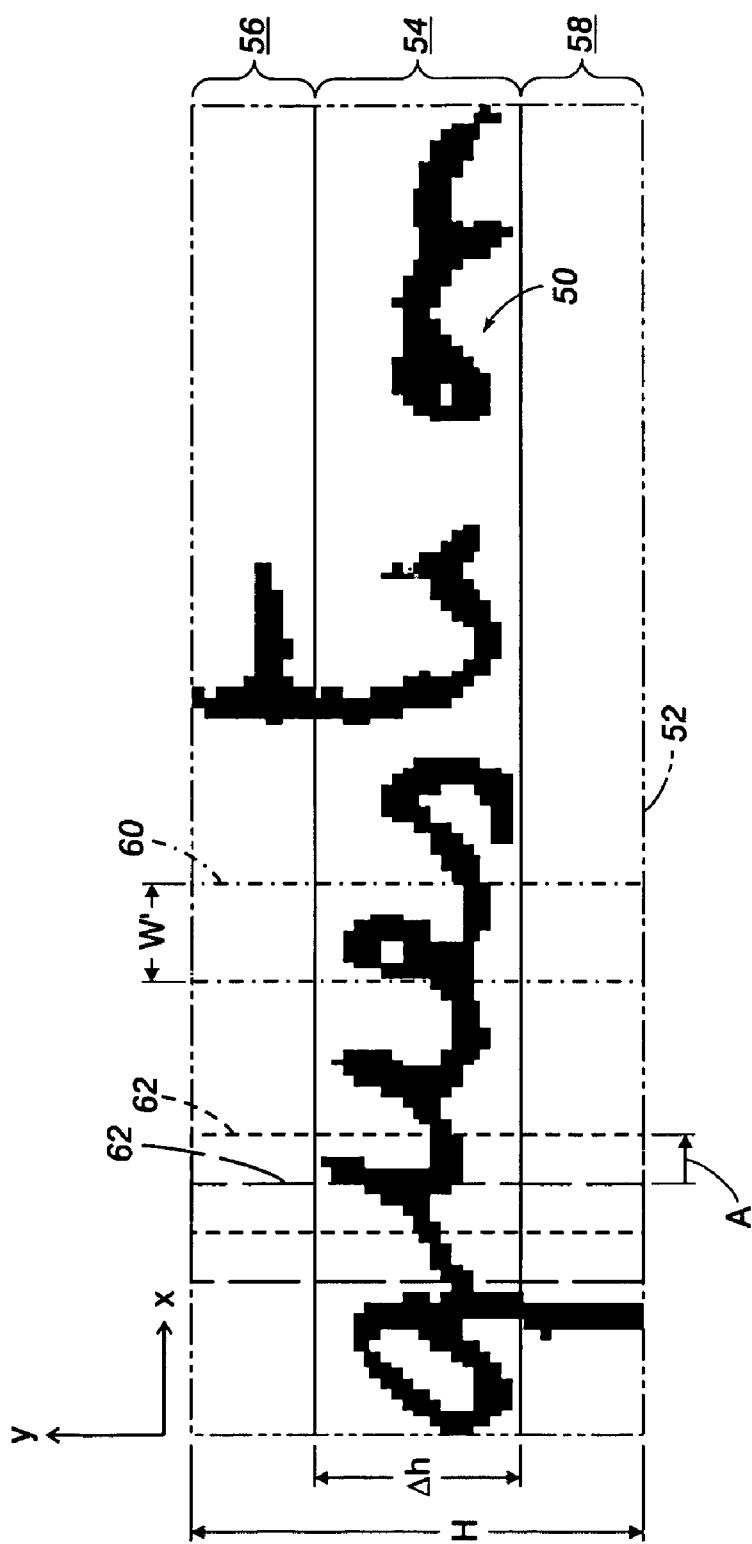
FIG. 4 illustrates identifying the center of gravity of a window.

Codebook Generation:

To generate the codebook, an analogous method to that used for the candidate word images is employed, as illustrated in FIG. 4. The method begins at S200. At S202, for each of a set of known words, the method includes optically reading a handwritten or typed known word so as to form an image representation thereof (a training word image) comprising a bitmap of pixels. At S204, the acquired training word image may be subjected to one or more pre-processing steps, as for the candidate word images. At S206, a sliding window is traversed stepwise across the training word image using the same step size as for the candidate word images. For each window, a horizontal displacement value is computed from window statistics (S208). In particular, the center of gravity of the image data in the window is computed (if recentering is to be used for the actual images). At S210, the window is moved such that it is recentered on the center of gravity. At S212, one or more features of the window image within the centered window are computed in the same manner as for the candidate image (if recentering is not to be used for the actual images, the features are computed on widow images without recentering). At S214, the features may be normalized. At S216, a visual vocabulary is obtained by clustering the low-level features extracted from a large number of patches the training images, using for example, K-means. These clusters of characters having similar features are automatically generated by the classifier. The clusters may include characters which appear similar to letters, parts of letters, connectors or other elements which have similar extracted features. A predetermined number of such clusters may be generated, such as about 64. At S218, the training word image is characterized, based on the set of computed and optionally normalized features and location distribution information. In particular, the training word is characterized according to cluster probabilities and location information. At S220, the characterized training word image is stored in the codebook, indexed according to the known word it characterizes. For each known word, several characterized training word images may be stored, for example, in different handwriting styles, font types, or the like. The method ends at S222.

Further details of the steps outlined are provided below.

Figure 3:
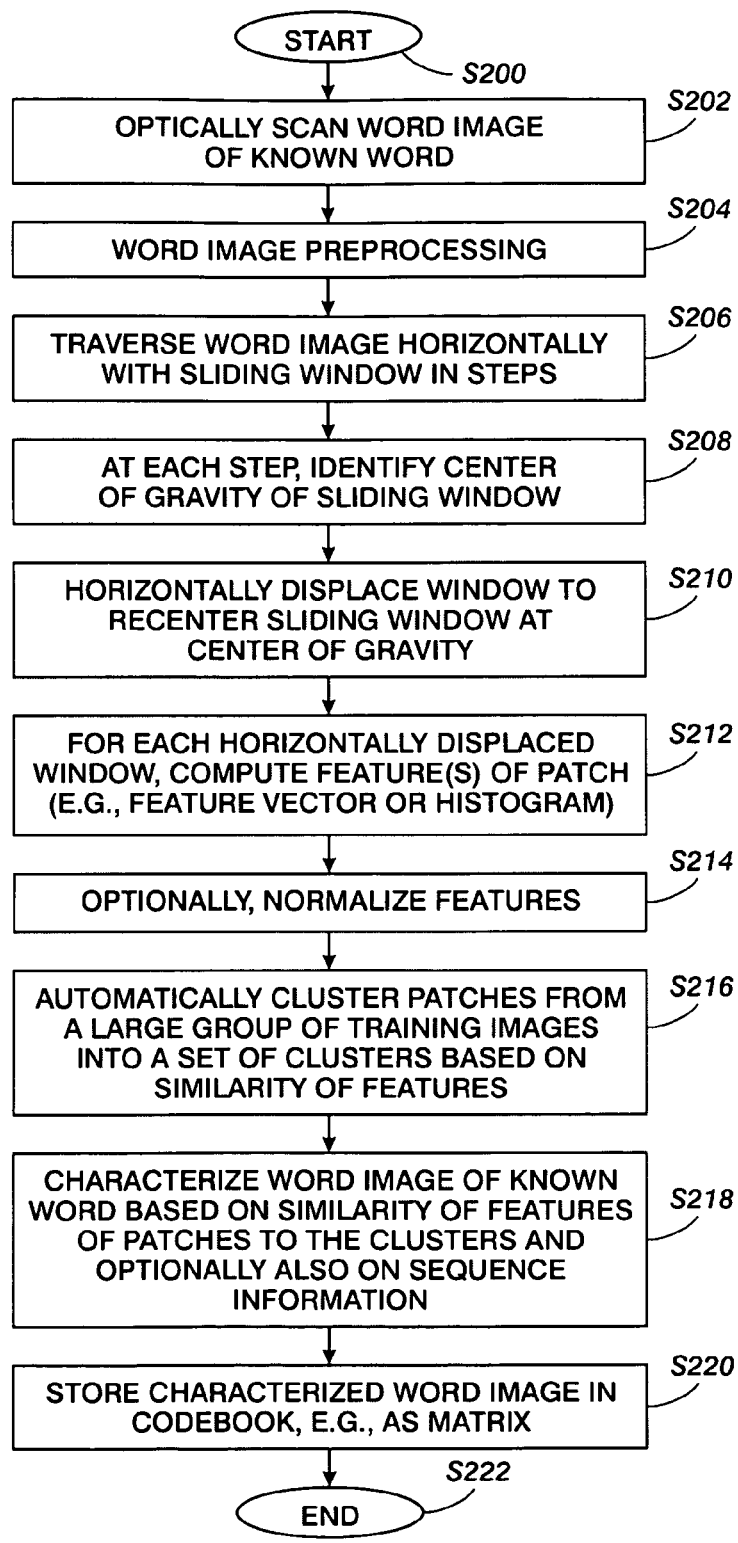
FIG. 3 illustrates an exemplary word image for the handwritten word "question" and a sliding window in process of traversing the word image.

With reference to FIG. 3, an exemplary word image 50 of the handwritten word "question" is shown for purposes of illustrating aspects of the exemplary embodiment. The word image 50 is entirely contained within an imaginary bounding box 52, which is the smallest rectangle within which the word can be fitted. Words can be defined in terms of a main body portion 54 of height Ah, an ascender portion 56, above the main body portion, and a descender portion 58, below the main body portion. In these latter two regions 56, 58, which are not, of course, present in all words, the tails of some letters, such as in the lower case letters t and q in the word "question", would normally be found.

Generating Word Images

In S102, an image of a document to be processed may be captured by a sensor, such as a scanner or camera. Word images, generally corresponding to words in the captured image, are then extracted as a series of tokens. A bounding box 52, which is the minimum sized rectangle required to enclose the candidate word image 50 is generally defined in this step.

One method for generating candidate word images from a document image may include a thresholded reduction and morphological closing of the image data to cause the individual characters in words to merge together, while preserving the interword spacing. Such techniques for identifying word images are described, for example, in U.S. Pat. Nos. 5,438,630; 5,745,600; and 5,825,919, the disclosures of which are incorporated herein in their entireties by reference. More sophisticated methods may include identifying lines of handwriting through projection profile analysis. The minima of the projection profile give the positions of the line splits. Individual words on each identified line are then identified. In particular, word hypotheses are extracted by analyzing the gaps between connected components. In theory, large gaps are more likely to correspond to word gaps while smaller ones correspond to character gaps. Further details of such techniques for identifying word images are given in U. Mahadevan and R. C. Nagabushnam, "Gap metrics for word separation in handwritten lines," in Third International Conference on Document Analysis and Recognition (ICDAR'95), vol. 01, (Los Alamitos, Calif., USA), p. 124, IEEE Computer Society, 1995; and K. Takru and G. Leedham, "Separation of touching and overlapping words in adjacent lines of handwritten text," in Proceedings of the Eighth International Workshop on Frontiers in Handwriting Recognition (IW-FHR'02), (Washington, D.C., USA), p. 496, IEEE Computer Society, 2002. In this stage, fast rejection of image data which is likely not to be word images is readily accomplished.

Preprocessing:

The preprocessing step (S104) may include image processing of the document image 12 or candidate word image 50 and may include one or more of the following:

1. Binarization: In this step, the image is converted from a grey level image to a binary image. A number of algorithms are available for this step, as described, for example, in BUNKE, H., Recognition of cursive Roman Handwriting—Past, Present and Future, in *Proc. of the Seventh International Conf. on Document Analysis and Recognition* (ICDAR) (2003), and references cited therein (hereinafter "Bunke").

2. Smoothing: Smoothing techniques attempt to remove noise. In one method a Gaussian filter with a standard deviation σ is applied to the word image, as described, for example, in RATH, T. M. and R. MANMATHA, ISSN 0-7695-1960-1, Features for Word Spotting in Historical Manuscripts, pp 218 (2003). Other smoothing techniques include vertical and horizontal morphological closing operations, which generally remove black shapes which smaller than a predetermined approximate size. Other techniques for smoothing are described, for example, in U.S. Pat. No. 6,091,859 to Sonobe, et al., the disclosure of which is incorporated herein by reference in its entirety.

3. Correction of the skew (deviation of the baseline from the horizontal direction and correction of the slant (deviation of average near-vertical strokes from the vertical direction. The slant and slope are introduced by the different writing styles of individual writers in cursive writing. Both corrections can reduce handwritten word shape variability. Techniques for performing these corrections are described, for example, in Bunke.

4. Normalization of the word images: In this step, the height of each candidate word image 50, is normalized to a fixed height. In the normalization step, the height Ah of the main body (or core region) 54 of the word may be normalized to a fixed number of pixels, and ascender and descender regions 56, 58, where present, may also be normalized to fixed sizes. In one aspect, the height Ah of the main body is normalized to about 10-30 pixels, e.g., about 18 pixels. Ascender and descender regions may each be similarly normalized to 18 pixels, resulting in a fixed height H of 54 pixels. Since the main body height Ah is approximately proportional to the width of an individual character in the character string, normalization helps to generate word images with a length which is approximately proportional to the number of characters in the string.

Sliding Window:

With continued reference to FIG. 4, patches (window images) 60 are extracted from candidate word images 50 at a single scale and along a single dimension, the x axis. In the illustrated embodiment, the patches 60 are of fixed width W' and full word image height. In the exemplary embodiment, the patch width is set to 21 pixels. The only free parameter in this context is thus whether the patches are selected at regular intervals (corresponding to the step size) or not. In one embodiment, the patches are obtained at regular intervals. In another embodiment, the patches 60 are obtained at irregular intervals, as a result of the horizontal displacements from the regular step positions. Irregular patch extraction has advantages in that displacing a patch can reduce the patch variations, resulting in a more compact codebook. Additionally, it can reflect the assumption that certain image regions are more informative than others.

Figure 5:
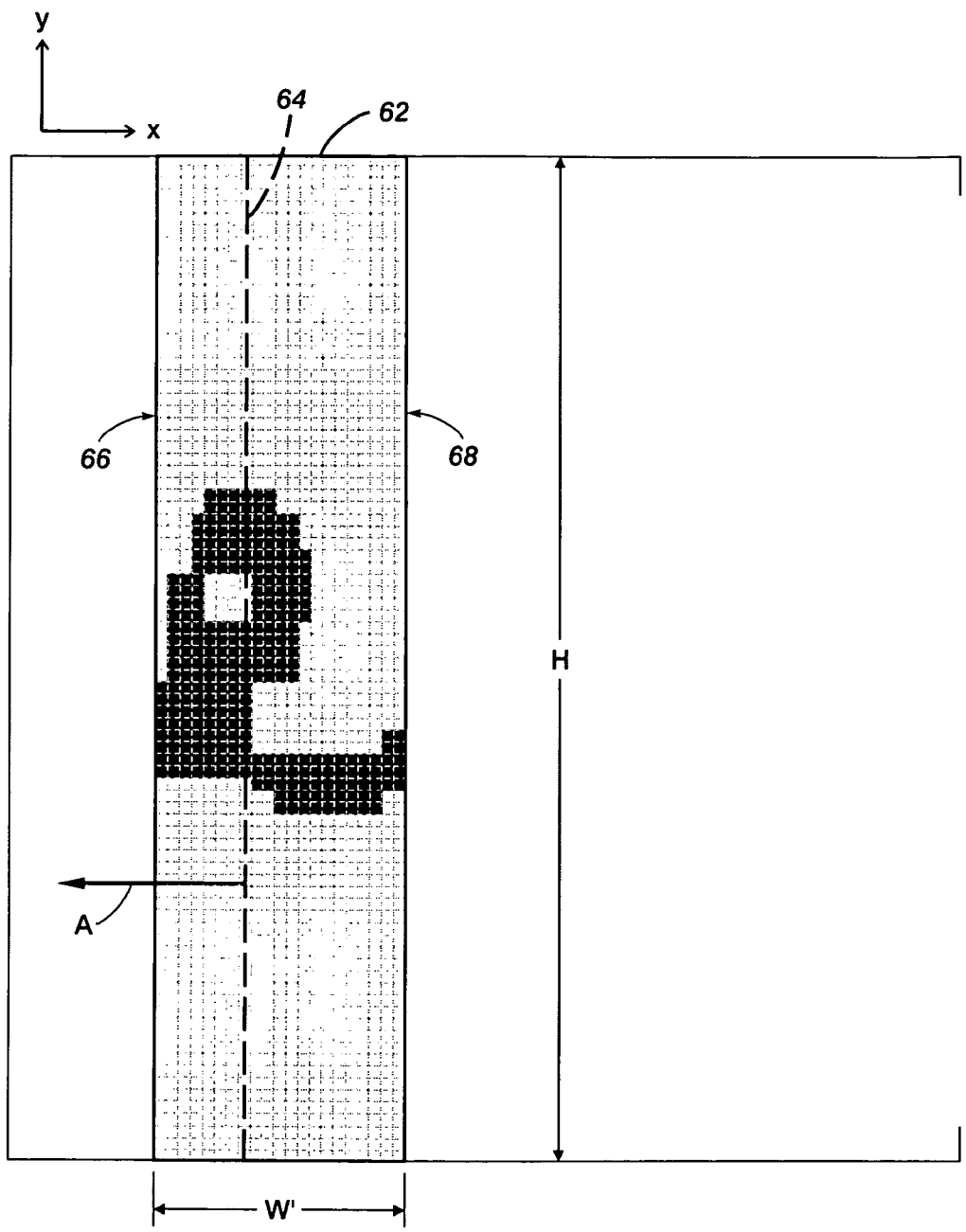
FIG. 5 illustrates moving the window to center on the center of gravity.
Figure 6:
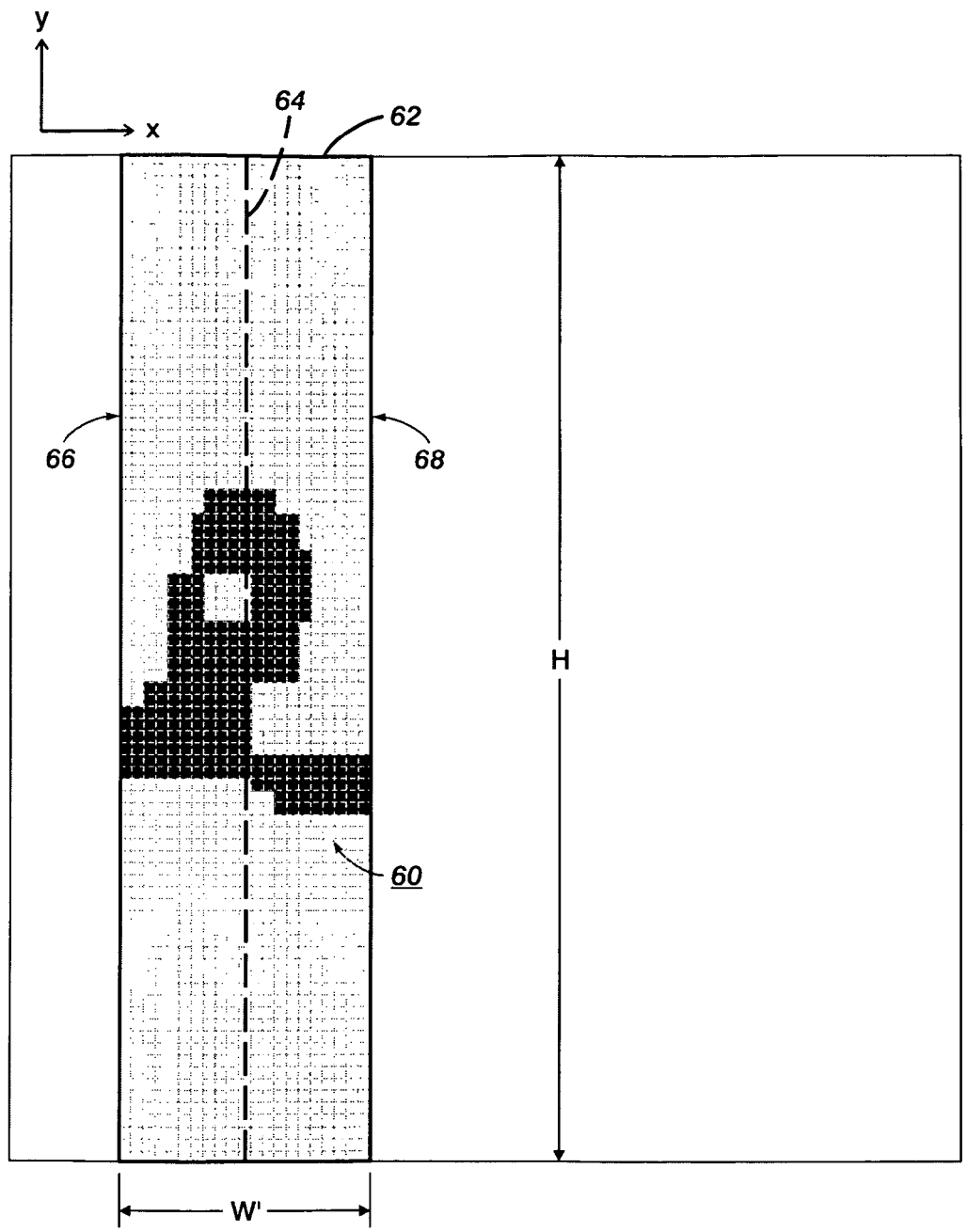
FIG. 6 illustrates a window image generated by centering the window on the centre of gravity shown in FIG. 5.

Assuming an image I(i,j), such as word image 50, is of height H and width W, where i and j are, respectively, the row and column indices. At each column j, a window 62 of height H and width W' is centered. The window 62 is moved stepwise across the word image, e.g., by one column at a time in the direction of arrow A. At each new window position, the image data within the window is used to determine a center of gravity 64 on the x axis (FIG. 5). In general, the center of gravity 64 is the lateral position on the x axis, within the window 62, at which equal number of ON pixels lie on either side (where ON pixels form the word image). The center of gravity can be computed for example, by summing the number of black pixels for each column and finding the average (e.g., median or mean). The centre of gravity 64 need not be computed accurately and approximation techniques may be employed (for example, by reducing the resolution of the image data in the window). The window 62 is then centered on this lateral position 64, as shown in FIG. 6. Thus for example, if the window is 21 pixels wide, the window 62 is horizontally displaced so that the center of gravity is about eleven pixels from the trailing edge 66 or leading edge 68 of the window. As will be appreciated, the window 62 may be displaced left or right (receded or advanced) in this step. Or, in some instances, where the window 62 is already centered on the center of gravity of the image data, it is not displaced at all. The patch 60, constituting that portion of the word image 50, in the horizontally displaced window 62, is then used in the feature extraction step.

In the exemplary embodiment, the window 62 moves stepwise, from left to right by 1 pixel along the x axis, generating a centered window and horizontally displaced window at each position. In an alternative embodiment, the window may move by a regular amount S which may be greater than 1 pixel, such as 2, 5, 10 or more pixels. One advantage of this sliding window approach is that it preserves the left-to-right nature of the writing. As will be appreciated, for scripts which use a vertical rather than a horizontal alignment of characters, such as Chinese, the displacement can be in the vertical rather than the horizontal direction., i.e., along the same axis as the stepwise translation.

As an example, the sliding window 62 of 21 pixels in width is moved across the entire word image in steps of 4 pixels. Assume that the lateral displacements at each step are $d_1$, $d_2$, $d_3, d_4, \ldots d_n$, where $d_2, d_3, d_4$, are integers and can range from −11 to +11 pixels (the displacements of the terminal window positions being limited to displacements within the bounding box 52). If, for example, $d_1$=+1, $d_2$=−1, $d_3$=−2, and $d_4$ is −6, the column indexes of the fir three patches are thus 11+1=12, 15−1=14, 19−2=17, and 23−6=17, respectively, i.e., are irregularly spaced, and in the case of the last two patches, are overlapping.

The width W' of the window 62 in the x direction, which is generally less than the width of the word image W, may be selected to be approximately equal to or somewhat wider than the average anticipated width of a character. For example, W' may be approximately 1-3 characters in width. There is no need to make an accurate determination of character width, however. For example, the character width can be assumed to be proportional to the normalized value of Δh. For example, W' may be from about 0.7 to 2 times Δh in pixels. In general W' may be selected to be less than about H, since the width of a character is typically less than the height of the bounding box 52. In the exemplary embodiment, W' may be about 30 pixels. An appropriate value for W' can be determined through experimentation. In general, the same fixed value of W' is employed for all of the word images 50 in the document.

Prior to sliding of the window 62, any column j of the word image 50 in which there are no active pixels (i.e., the entire column is white) may be eliminated from the word image 50 to facilitate processing of the data. It has been found, in practice that removing columns in which all pixels are inactive improves the results.

Feature Extraction and Characterization:

In the feature extraction step (S112), a variation of the "Bag of Visual Words" (BOVW) particularly suited for handwritten word spotting may be employed. A BOVW approach has been described in above-mentioned U.S. Pub. Nos. 20070005356 and 20080069456 for extraction of features in images, and is adapted here for word image characterization. For each horizontally displaced window image 60, one or more features (local appearance descriptors) are extracted. The features can be extracted for the window image as a whole or portions thereof. Various methods for extracting features are described for example, in application Ser. Nos. 11/847,742; 11/847,757; and 12/014,193. For example, features may be obtained for key points, cells, gradient orientations of pixels, or the like, which may then be concatenated to form a features vector, or histogram, which represents the window image as a whole. In one embodiment, each window image is partitioned into an M×N array of cells with a feature being computed for each cell, as described, for example, in above-mentioned application Ser. No. 11/847,757.

In the exemplary embodiment, however, the patches are simply described with the 1134-dimensional raw pixel values (one value for each of the 21×54 pixels). Dimensionality can then be reduced using Principal Component Analysis (PCA). For example, the dimensionality may be reduced to 128 dimensions without resulting in a significant loss of information. In another embodiment, relative pixel count histograms on a polar partition of the patch may be used as the descriptors. This results in 160-dimensional patch descriptors for each patch. Dimensionality can again be reduced to 128 through PCA. Both these approaches give similar results in experiments, showing that the approach can readily achieve good performance with very simple but different patch descriptors.

High Level Descriptors

In the characterizing step (S116), the local appearance descriptors for each of the horizontally displaced window images are combined to generate a high level descriptor of the word image as a whole. A conventional implementation of the Bag Of Visual Words (BOVW) does not take into account sequential aspects. In the conventional method, feature vectors identified from patches of the image (analogous to the exemplary horizontally displaced window images) are considered as a loose collection, a "bag". In the present embodiment, the features for the window images are again considered as a loose collection at the high-level image descriptor stage, but sequential information may be added to the features extracted from the window images. Thus for example, each window image may be assigned to one of a set of horizontal location bins, e.g., about 20, which may each span an equal number of pixels in the word image, the assigned bin thus representing the approximate location of the window image within the word image. This approach allows consideration to be placed on the locations of the window images in the word image, without requiring them to be in a specific order to generate a match with a codebook word image.

In the classification stage (S118), both the location distribution of the features and the features of the window images are considered when comparing the characterized word image with the corresponding features and location distributions of a set of stored word images of known words in the codebook. This can be done by considering, for a given word, the location distribution of the codebook. The resulting descriptor is shown to improve performance when compared with an embodiment that does not consider location information.

The exemplary methods allow a fixed length representation of the word image despite using local information. This facilitates retrieval of matching words from the codebook.

As in the standard BOVW approach, vector quantization may be used for characterizing the content of image patches 60. High-level descriptors, in this case, can be histograms where each bin corresponds to a codebook element and the values are the frequency of patches assigned to the bin. Where no spatial information is included, the final feature dimensionality is equal to the codebook length. When spatial information is not considered, any permutation of the word characters should yield a similar probability. However, the present embodiment allows spatial information to be considered.

Taking into account spatial information is particularly relevant for word spotting. In order to take into account the probability of finding a certain codebook element at a given horizontal location, the image may be divided into J equidistant location bins, where J can be, for example, from two to about 100, such as about 20. For a given candidate word image, patches can be directly coded by their vectors of location and codebook membership probabilities. In the exemplary embodiment, this means a 1280-dimensional encoding (20 location bins×64 codebook representatives) per patch. The final image encoding (high-level features) is the result of aggregating this representation for all patches, typically adding patch encodings.

If $p(k,j|I)$ represents the joint probability that a patch 60 of image I is found at a certain location $j=1 \ldots J$, and has certain codebook membership $k=1 \ldots K$, then for word image I, this choice yields the high-level feature vector, $$y_{kj} = \frac{1}{M} \sum_{m=1}^{M} p(k, j | I, m)$$

where $m$ represents a patch, $m = 1 \ldots M$.

Essentially this gives the probability of finding a patch in a particular location for all samples of a given word in the code book. This may be normalized by the total number of patches (M) but this is not required since this value could potentially convey valuable information, e.g. about image width. The word images in the codebook can also be expressed with the same high level feature vectors so that the probability of a new word image corresponding to one in the codebook can be computed by comparing the features vectors.

Though the exemplary embodiment has been described in terms of a hard vector quantization approach and discrete locations, the method could be easily extended to the probabilistic and continuous case. In particular, probabilistic mixture models may prove more effective than hard quantization in modeling the distribution of training patches and subsequently coding new patches by their vectors of posterior mixture-component membership probabilities. The location probabilities can also be considered in a continuous space by either estimating the distributions or, more simply, soft voting. In another approach, hard codebook membership assignment is used but the location dimension is smoothed to take into account the irregular spacing often found in handwriting.

A classifier 24 can be then trained directly on the resulting high-level features or additional transformations can be applied to the representation, for example, for dimensionality reduction. For example, the features may be transformed in a way which yields a low dimensionality and takes into account both negative and positive sample distributions. This method includes first estimating, from all the patches of positive (true word) images, a probability $p_w(k,j)$ and from all patches extracted from negative (false word) images, a probability $p_w(k,j)$. Instead of using probability counts, an aggregate over log-likelihood ratios is used and to reduce dimensionality, a marginalization over the location is used, such that the final high-level feature vectors are:

$$y_k = \frac{1}{M}\sum_{j=1}^{J}\sum_{m=1}^{M}(\log(p_w(k, j)) - \log(p_w(k, j)))p(k, j | I, m)$$

A linear classifier can be trained with this representation. Any suitable classifier can be used, such as those based on Linear Fisher Discriminant Analysis (LDA) or Linear Sparse Logistic Regression (SLR). Both approaches yield a discriminating hyperplane and threshold on the projection values is then used for determining true from false instances, i.e. detected words. Ii may be noted that if the particular projection $\Sigma_{k=1}^{K} y_k$ is chosen, one obtains a pure generative Bayesian classification model with an independence assumption on location, codebook membership and patch samples.

Codebook

The codebook 26 can be in the form of a matrix for each stored word where the 64 (or other convenient number) clusters form one dimension and the location (e.g. from 1-20) forms the other dimension, and the entries in each cell can be the frequency/probability that each cluster is found in each location. The codebook also includes an analogous matrix for negative words.

EXAMPLES

Example 1

Figure 7:
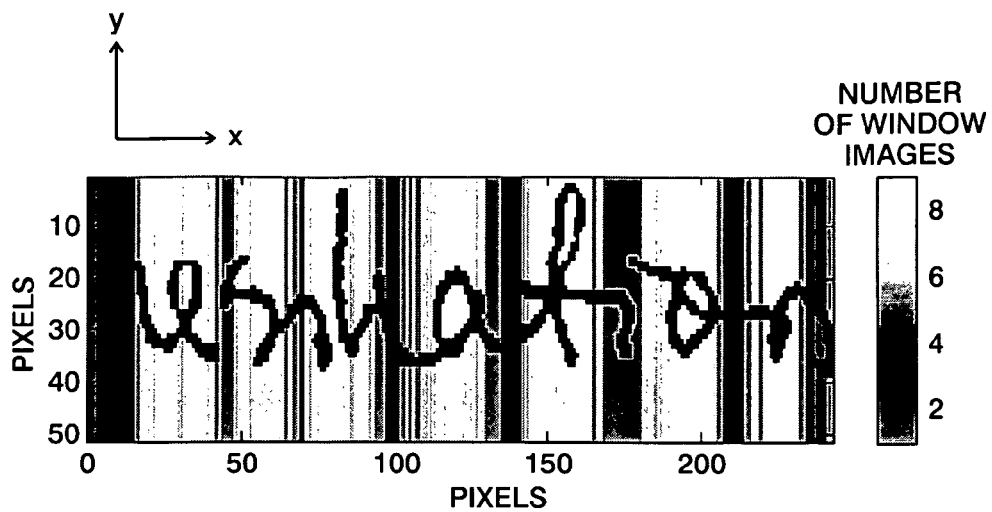
FIG. 7 illustrates the number of patches in which each column of a word image of the word resiliation is included, demonstrating that regions where variation is greater appear in more correspondingly more patches.

As an example, a 21 pixel-wide rectangular window and a step of 4 pixels were used to generate patches 60 for a word image 50 of 54 pixels in height. FIG. 7 illustrates the number of patches in which each column j is included for the French word resiliation (which means cancellation). For a regular grid (without horizontal displacements from the steps), the number for each column would be uniform, except at the left and right borders of the word image. It can be seen that the exemplary method automatically and logically extracts a larger amount of descriptors in the denser regions, e.g., within the characters, and fewer descriptors around the connectors between characters.

Figure 8:
FIG. 8 illustrates an average patch from over 3000 images if a regular grid approach is chosen for patch extraction.
Figure 9:
FIG. 9 illustrates an average patch from the same >3000 images if the irregular grid is used.

FIGS. 8 and 9 compare the average pixel value for over 500,000 patches extracted with a regular and irregular grid approach, respectively. FIG. 8 illustrates an average patch from over 3000 images if a regular grid approach is chosen for patch extraction and FIG. 9 illustrates an average patch from the same >3000 images if the irregular grid is used. It can be seen how the irregular grid provides improved patch invariance with respect to horizontal translations. This results in a more compact codebook.

To test the method, patches were described with the 1134-dimensional raw pixel values (21×54 pixels) and dimensionality was then reduced using 128-dimensional PCA. In another embodiment, relative pixel count histograms on a polar partition of the patch were used as the descriptor, followed by PCA.

A codebook was built through unsupervised classification of the low-level patch descriptors. At this step, K-means clustering was performed with K=64 (i.e., generating 64 cluster centers) and using the L2 distance (Euclidian distance) as a basis for assigning patch descriptors to clusters. As with PCA, no parameter tuning was performed, for simplicity. Visual inspection of the cluster representatives, i.e. codebook members, show that even with simplistic patch descriptors and a straightforward K-means approach, the model is able to learn characters that frequently appear in a word. One can find frequent letters or more general features, such as ascender characters, connectors, etc. Three such cluster representatives are shown in FIG. 10.

Figure 10:
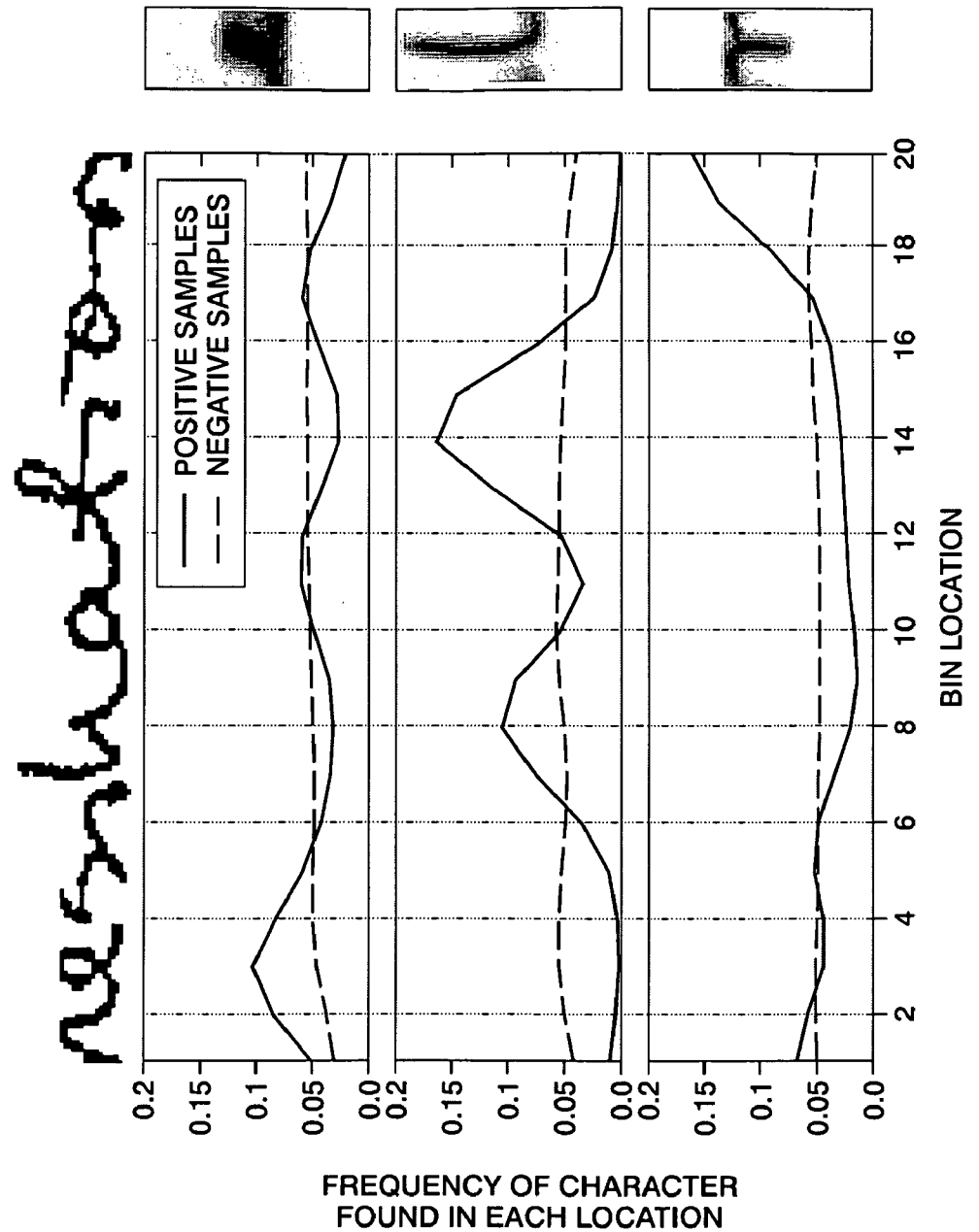
FIG. 10 illustrates the frequency (horizontal location probability) with which a cluster center selected form the code book (shown at the right of each plot) is found in each location for both positive samples (solid) and negative samples (dashed) of word images for the word resiliation.

For explanatory purposes, three codebook members that closely resemble known characters are shown in FIG. 10. The visual vocabulary can also account for other objects such as character combinations or inter-character connectors. As previously noted, the characters are not imposed but learned from the training data. For each chosen codebook member, the horizontal location probabilities of the cluster for the positive samples of the word "resiliation" are shown (solid black) and for the negative samples (dashed lines) are plotted. These probabilities are the frequency with which a patch in the corresponding location contributes to the selected cluster.

It can be readily seen that each cluster receives high probability on the location of the corresponding character within the word "resiliation". For example, it can be seen that the cluster center which looks a bit like a letter "e", is found with fairly high frequency at location 3 in positive samples of the word resiliation, and also occurs at relatively low frequency at location 8. Also, the distribution of the cluster for the negative samples is almost uniform. This indicates that the positive likelihood could be used with similar results to those given by using the likelihood ratio. Experiments show, however, that taking into account the negative values has slight advantages in terms of performance, with little or no impact on computational cost. This is likely due to the fact that the negative model still conveys universal information as can be seen in the lower probability of finding character "e" at the beginning of the negative samples.

Example 2

The method described above was implemented and two words were chosen for evaluation: Monsieur and resiliation.

Handwritten samples were first filtered using a simple fast rejection approach and normalized to 54 pixels in height to generate word images, as detailed above. Positive and negative samples of each word were obtained (for example, the word resiliation could be a negative sample for Monsieur, and vice versa). On this data, experiments were performed using 5-fold cross validation.

These experiments were designed to show whether the non-regular patch extraction has an advantage over the regular approach and whether location information has a positive impact on performance.

For this purpose, experiments were run with three models: Model 1 is the result of using a pure BOVW approach for the representation of word images and a linear classifier for the classification, in this case Linear Discriminant Analysis. This model does not take into account location probabilities. Two models taking into account location distributions were also used. Model 2 is a generative (Bayesian) approach that takes into account location information. Model 3 uses a representation that takes into account location information to then apply a linear classifier, in this case Linear Discriminant Analysis. In all experiments, Sparse Logistic Regression was also evaluated as classifier of choice and performance was comparable to that of Linear Discriminant Analysis.

Figure 11:
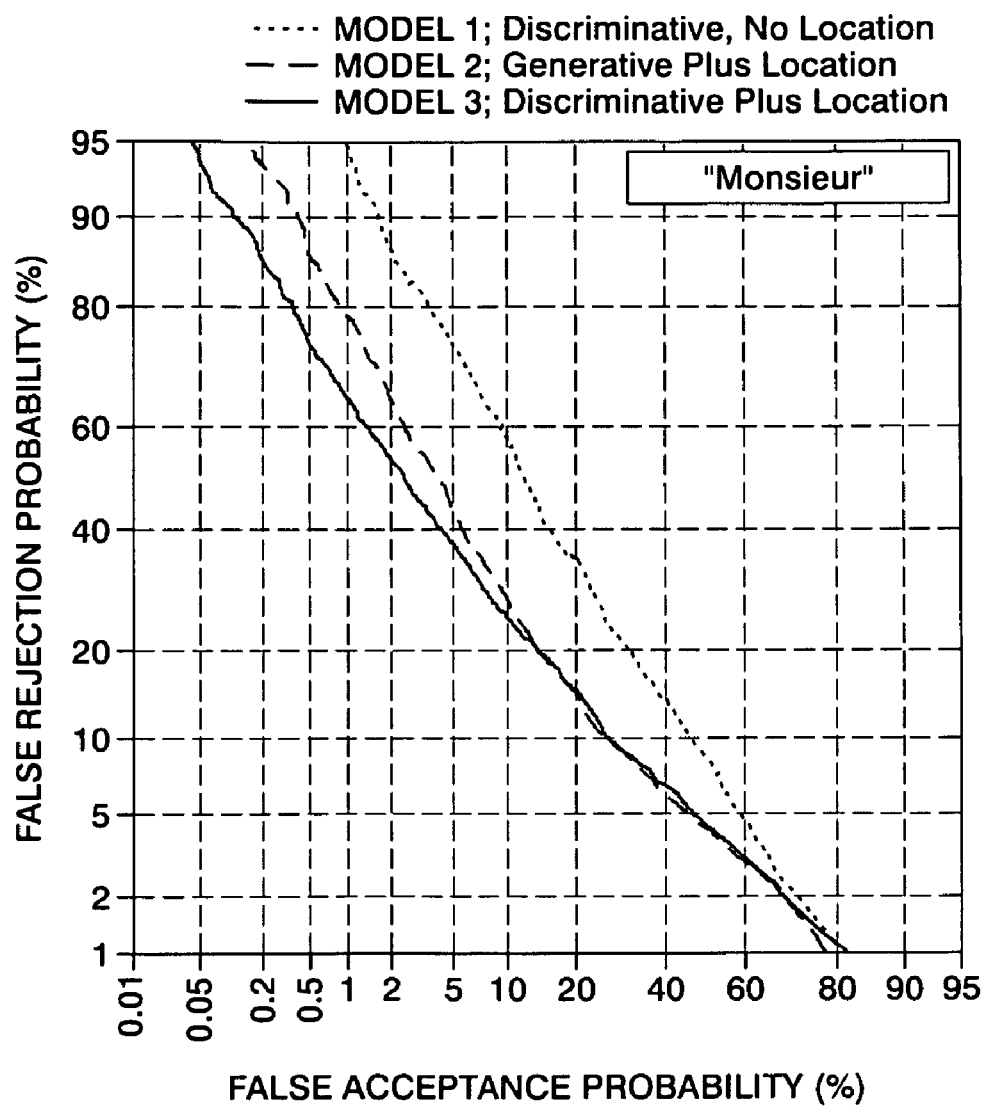
FIG. 11 is a plot of false rejection probability vs. false acceptance probability obtained using three models (a discriminative model that does not take into account location probabilities, resembling a pure Bag of Visual Words (BOVW) approach, and two models taking into account location distributions, namely a generative model and a discriminative model), for the word Monsieur.
Figure 12:
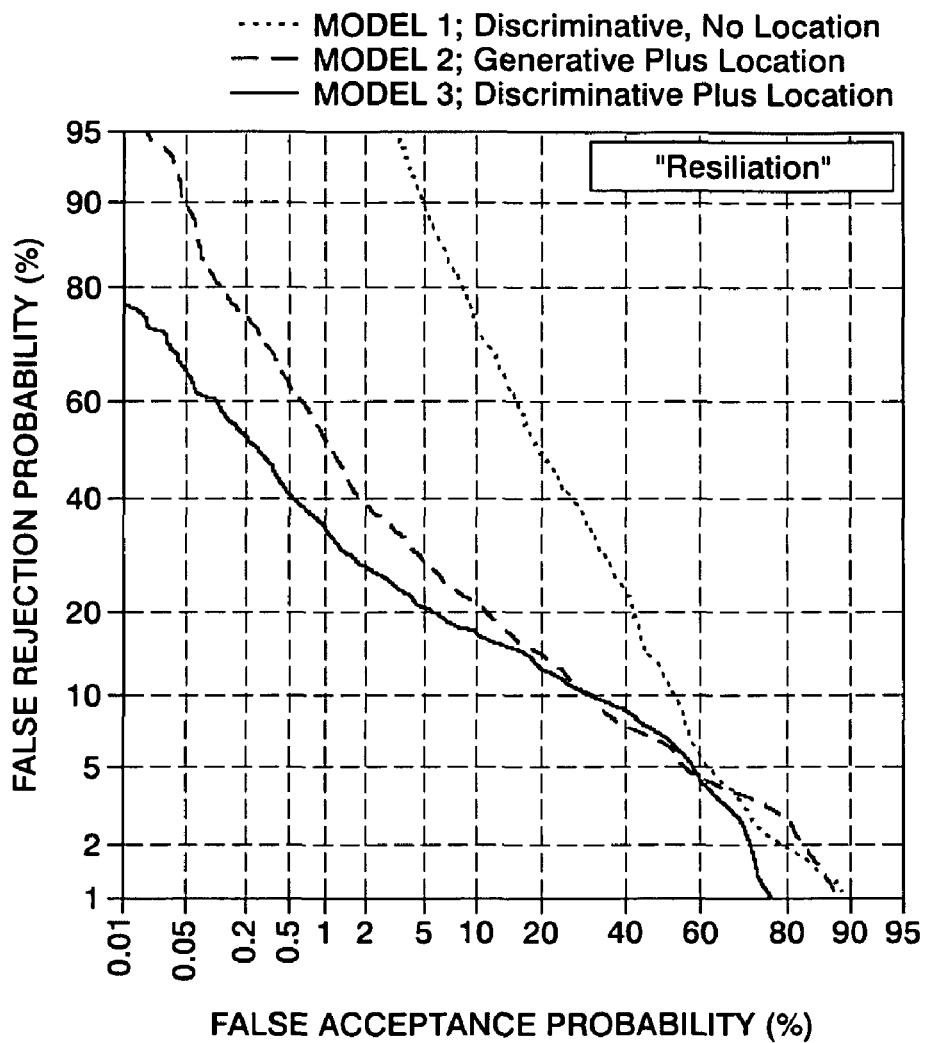
FIG. 12 is a plot of false rejection probability vs. false acceptance probability obtained using three models (a discriminative model that does not take into account location probabilities, resembling a pure BOVW approach, and two models taking into account location distributions, namely a generative model and a discriminative model), for the word resiliation.

The results are shown in FIGS. 11 and 12 for the two words, where false rejection probability is plotted against false acceptance probability. The aim of a generic model is to have both a low false rejection and a low false acceptance. Specific models compromise on which axis to focus, depending on the application. The results using the approach of model 3 were surprisingly little better than results using the very simple model 2. The two models 2 and 3 which used the location information both gave better results than the discriminative model 1 with no location information. As a reference, experiments were performed using gradient histograms as features that feed into an HMM model, as disclosed in U.S. application Ser. No. 12/014,193. Model 3 gave better results than this gradient histogram approach.

From these experiments it can be concluded that non-regular patch extraction can improve performance, e.g. for a fixed false rejection probability of 10%, false acceptance drops from 40% to 30%. The advantage of using location information is significant. A pure BOVW approach performs similarly to the worst prior approaches.

In general, the generative model is outperformed by the discriminative model. However, performance is very similar when low false rejection rates are imposed, a preferred choice in wordspotting scenarios.

The exemplary method which employs both displacement of windows (irregular grid) as well as a BOVW+location approach to characterization outperforms, for the two chosen words, other implemented techniques. As noted below, this proof-of-concept implementation can be improved in a number of directions, giving even greater expected advantages over existing methods.

Within the wordspotting scheme, the speed and characteristics of this approach allow for it to be also considered as a feasible fast rejection stage. Results show that, for example, the exemplary method can eliminate more than half of the false positives with less than 5% rejection rate. Additionally, though this approach has been designed, implemented and evaluated for handwritten wordspotting it is also feasible for object detection where there is a sequential ordering in the object representation.

Additional Modifications

The BOVW implementation disclosed in the Examples above is a relatively simple approach, to demonstrate its usefulness. Despite this, the results are more than acceptable. Further improvements may be achieved by incorporating one or more of the following approaches into the exemplary method:

Normalization: Different settings may be employed for ascender/descender region sizes, rotation and translation invariances. Most, however, could be taken into account through improved low-level features.

Normalization to writing medium and writer style: This can be addressed by a number of different approaches, for example, in image preprocessing (none was applied in the examples), more advanced low-level features, as opposed to raw pixel values or through codebook adaptation to the user's writing style (a universal codebook was used in the examples).

Feature type: Gradient orientation histogram features have proved very effective for modeling patches. Using these features with adequate parameters may improve results.

Parameter setting: Most of the parameters were not refined, including image height, patch width, patch step, PCA dimensionality, codebook size, location bin number and distribution, smoothing parameters, classifier parameters (number of iterations, lambda parameter for SLR), etc. Experiments with different parameter settings may be used to optimize these parameters.

Irregular location partitions: For the examples, the word image was divided into equidistant bins. Using more advanced approaches such as those choosing regular splits defined by some energy function, which result in different bin sizes may yield an improvement.

Multiscale: A hierarchical representation is a natural extension of the present model and could help account for nonlinear deformations of content.

Continuous vocabulary: In the example, a simple k-means clustering was used for building the vocabulary with hard membership assignment for new samples. Continuous, probabilistic approaches have been shown to be more effective for this task. A discrete approximation of the patch location distribution may also be used.

Non-universal codebook: As noted above, a non-universal codebook would be able to account for writer style variations. It can also have other advantages, such as lower dimensionality, lower training data requirements, etc.

More advanced classification: While the examples were restricted to linear classifiers, other classifiers may prove more effective.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of characterizing a word image comprising:
   grouping window images of training word images into a set of clusters based on feature similarity;
   traversing an acquired word image in steps with a window;
   at each of a plurality of the steps, identifying a window image;
   for each of the plurality of window images, extracting a feature; and
   with a computer processor, characterizing the word image based on the features extracted from the plurality of window images, wherein the features are considered as a loose collection with associated sequential information and the characterizing is based on a similarity between the window image features and those of the clusters.

2. The method of claim 1, wherein the window images are uniformly spaced.

3. The method of claim 1, wherein the window images are irregularly spaced.

4. The method of claim 1, wherein the identifying a window image comprises displacing the window based on a center of gravity of image data within the window, to provide the window image.

5. The method of claim 4, wherein the displacement is on an axis of the traversing direction.

6. The method of claim 4, wherein the displacement is horizontal.

7. The method of claim 4, wherein the window is displaced to the center of gravity.

8. The method of claim 1, wherein the characterization is based on a joint probability of each window image being in a cluster and being at a location in the word image and corresponding joint probabilities of stored training word images.

9. The method of claim 1, wherein the characterizing includes associating location information with the window image features, based on a location of the window image in the word image.

10. The method of claim 9, wherein the associating of location information includes assigning the window image to one of a set of horizontally extending location bins which together span the word image.

11. The method of claim 1, wherein the feature extraction comprises for each window image, determining a features vector; and the characterizing comprises characterizing the word image based on the features vectors of the plurality of window images.

12. The method of claim 11, further comprising reducing the dimensionality of the features vector.

13. The method of claim 1, further comprising classifying the word image based on the characterization.

14. The method of claim 1, wherein the word image comprises a bitmap acquired by segmenting a document image.

15. The method of claim 1, wherein the word image is characterized without characterization of individual characters of a character string within the word image.

16. A computer program product comprising a non-transitory computer-readable medium encoding instructions, which when executed on a computer causes the computer to perform the method of claim 1.

17. A processing system including a processor which executes instructions stored in memory for performing the method of claim 1.

18. A method of characterizing a word image comprising:
with a computer processor, traversing a word image in steps with a window;
at each of a plurality of the steps, displacing the window based on a center of gravity of image data within the window, to provide a window image;
for each of the plurality of window images, extracting a feature; and
characterizing the word image based on the features extracted from the plurality of window images.

19. The method of claim 18, wherein window images of training words are grouped into a set of clusters based on feature similarity and the characterizing is based on a similarity between the window image features and those of the clusters.

20. A computer program product comprising a non-transitory computer-readable recording medium encoding instructions, which when executed on a computer causes the computer to perform the method of claim 18.

21. A processing system which executes instructions stored in memory for performing the method of claim 18.

22. The method of claim 18, wherein the displacing of the window based on the center of gravity of image data within the window comprises computing a horizontal displacement value from window statistics.

23. The method of claim 18, wherein the displacing of the window based on the center of gravity of image data within the window comprises computing a center of gravity of the image data in the window and moving the window such that it is centered on the center of gravity, the extracting of the feature including computing the feature within the centered window.

24. A processing system comprising:
a document segmentor which processes an input document image to identify word images;
a features extractor which extracts features of an identified word image and computes features vectors therefrom, the features extractor executing instructions for traversing the word image stepwise with a window and, at each of a plurality of the steps, computing a center of gravity of image data in the window, and thereafter displacing the window towards the center of gravity of the image data within the window to provide a window image, whereby window images are irregularly spaced, and, for each of the plurality of window images, computing a feature based on image data within the displaced window; and
a classifier which classifies the word image based on the computed features of the window images and location information for the window images.

25. The processing system of claim 24, wherein the classifier comprises a linear classifier.

* * * * *